May 7, 1957     E. J. RIVOCHE     2,791,508
FOOD PRODUCTS AND METHOD OF MAKING THE SAME
Filed Aug. 30, 1952     11 Sheets-Sheet 1
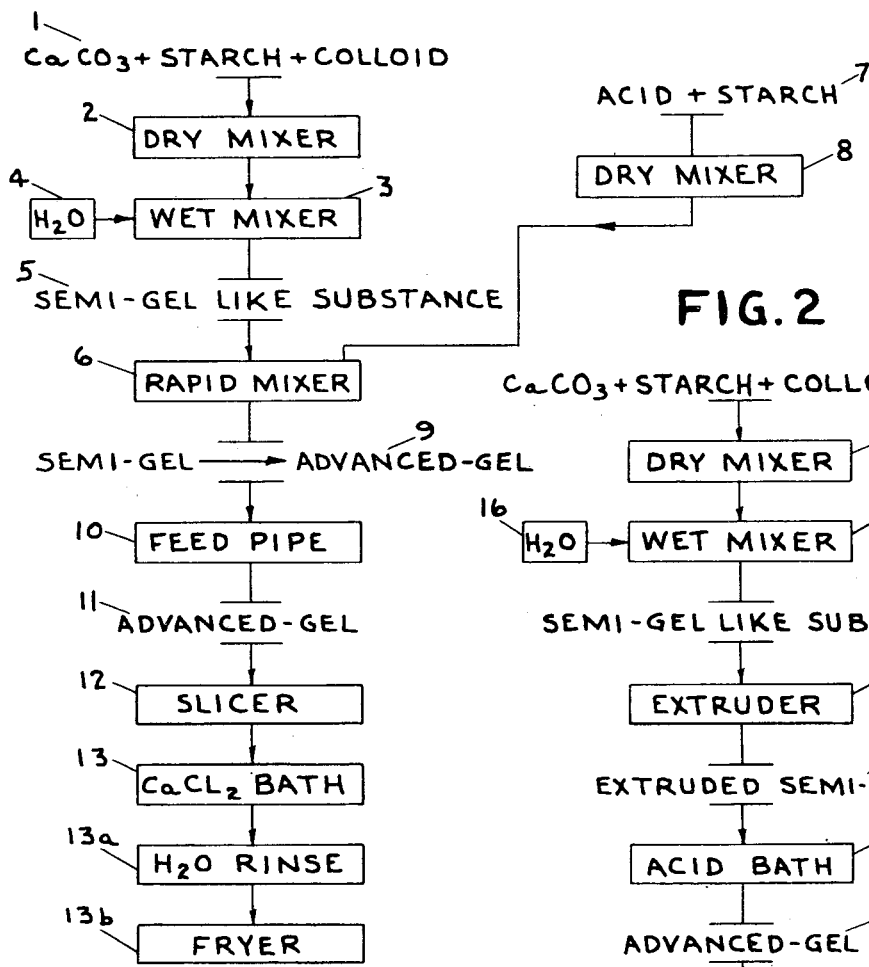
INVENTOR
EUGENE J. RIVOCHE
BY Bacon & Thomas
ATTORNEYS May 7, 1957  E. J. RIVOCHE  2,791,508
FOOD PRODUCTS AND METHOD OF MAKING THE SAME
Filed Aug. 30, 1952  11 Sheets-Sheet 2
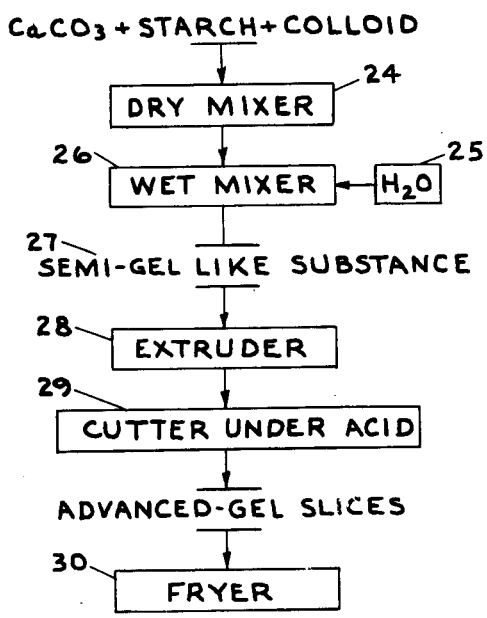
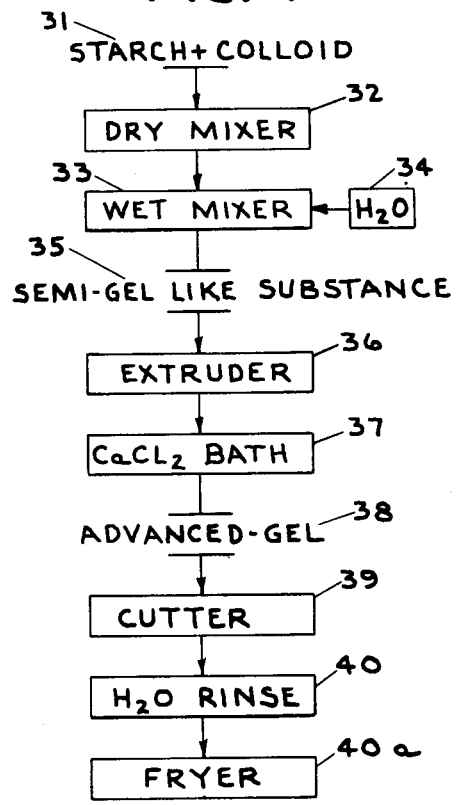
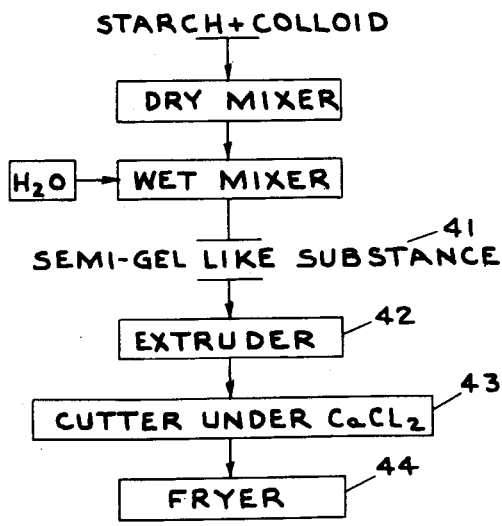
INVENTOR
EUGENE J. RIVOCHE
BY Bacon & Thomas
ATTORNEYS May 7, 1957 E. J. RIVOCHE 2,791,508
FOOD PRODUCTS AND METHOD OF MAKING THE SAME
Filed Aug. 30, 1952 11 Sheets-Sheet 6

INVENTOR
EUGENE J. RIVOCHE
BY Bacon & Thomas
ATTORNEYS

INVENTOR
EUGENE J. RIVOCHE

BY Bacon & Thomas

ATTORNEYS

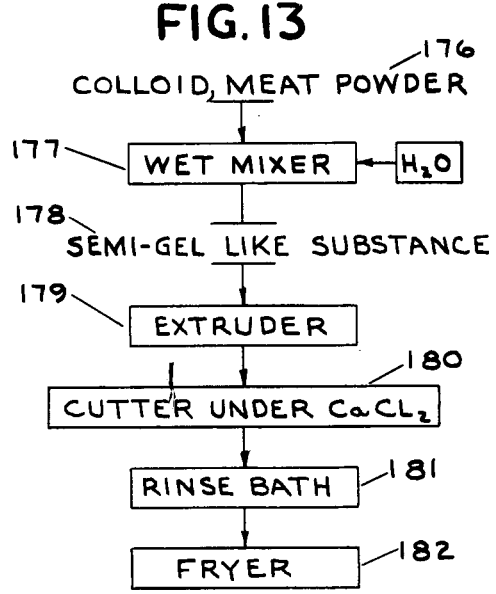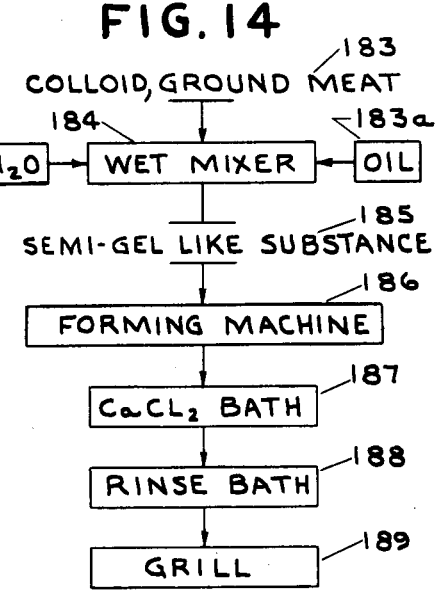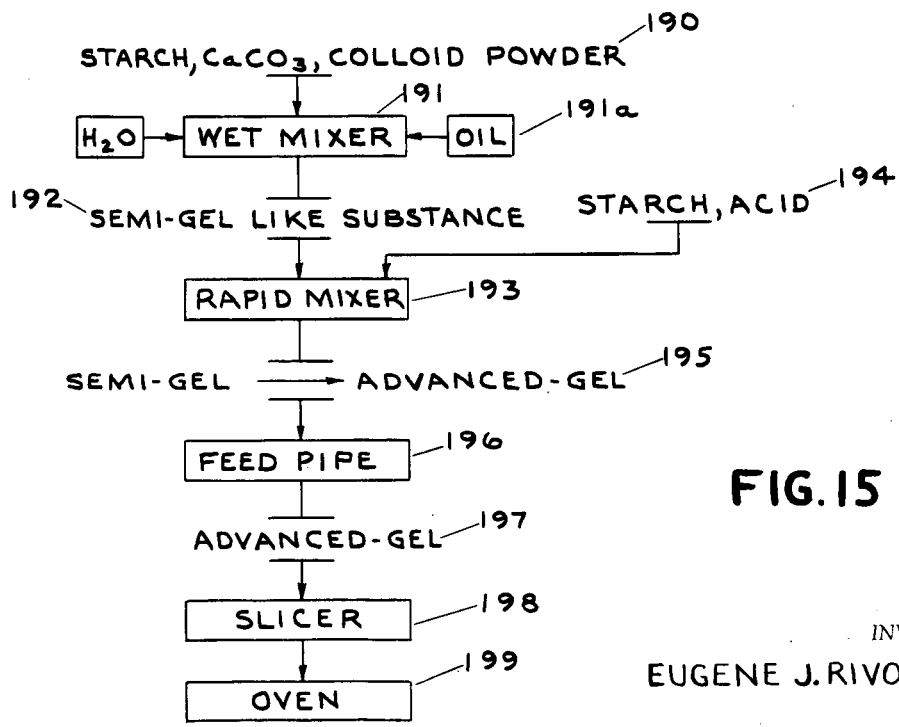

May 7, 1957  E. J. RIVOCHE  2,791,508
FOOD PRODUCTS AND METHOD OF MAKING THE SAME
Filed Aug. 30, 1952  11 Sheets-Sheet 9

INVENTOR
EUGENE J. RIVOCHE
BY Bacon & Thomas
ATTORNEYS

May 7, 1957 E. J. RIVOCHE 2,791,508
FOOD PRODUCTS AND METHOD OF MAKING THE SAME
Filed Aug. 30, 1952 11 Sheets-Sheet 11

INVENTOR
EUGENE J. RIVOCHE

BY *Bacon & Thomas*

ATTORNEYS

United States Patent Office 2,791,508
Patented May 7, 1957

2,791,508

FOOD PRODUCTS AND METHOD OF MAKING THE SAME

Eugene Joel Rivoche, Washington, D. C.

Application August 30, 1952, Serial No. 307,217

27 Claims. (Cl. 99—131)

This invention relates to:

(1) A new food structure which can be used as a base to incorporate powdered, granulated or comminuted foods, such as fruits, berries, vegetables, starches, flours or other farinaceous materials, as well as proteins and proteinaceous materials such as meat, fish and the like, to form new artificial foodstuffs which can be cooked, baked or fried to provide new edible products, and to the process of producing the same;

(2) A new artificial dough or bread and cake base with relatively low flour content and to the process of making the same, and (3) A new process for making dessert gellies instantaneously at a low temperature.

In a special application this invention relates to a new artificial potato product such as potato chips with a variable potato content or even free from potato and processes for making the same.

The process for the manufacture of ordinary potato chips necessitates not only a careful choice of potato but an elaborate and expensive series of pre-treatments, including curing up to three or four weeks at 70° F. or thereabout, grading for size, peeling, washing, slicing, rinsing and draining before the potato slices can be subjected to the cooking operation. Attempts have been made to produce artificial potato chips from potato flour or other farinaceous flours high in starch content, but all such processes and products have the inherent disadvantage that they require the use of large amounts of flour base, that is, enough flour to give a readily kneadable dough, usually about sixty to seventy percent of the total weight, or, in other words, a much larger starch content than is present in an ordinary raw potato, usually about twenty percent. However, this high flour content is necessary to form a dough of sufficient viscosity and body to allow forming and cutting and to give slices strong enough to allow frying in oil without disintegration. Any substantial decrease in the amount of flour used will render the dough too fluid to be cut or formed and entirely too soft to be fried. Furthermore, enough of the gluten present will generally be gelatinized to form a transparent glue-like substance so that the resulting chip will be glassy in appearance and therefore be markedly different in appearance and taste from an ordinary chip made in the usual way from a raw potato. In any event, the finished product can be obtained only as a relatively thick patty rather than slice and consists of seventy to eighty percent flour or starch base. As a result, the oil content of the finished product must necessarily be relatively low.

Attempts have also been made to produce similar meat and fish chips by incorporating meat or fish in sufficient flour dough or starch to lend the necessary viscosity and body to the mixture to enable slicing and after-cooking. The products obtained are in the nature of patties with high flour content rather than chips or wafers.

It is an object of this invention to produce a new, colorless, tasteless, crispy food structure having a negligible calorific value which may be used to incorporate or support comminuted or granulated food products.

It is another object of this invention to produce new food products by supporting comminuted food particles in a colorless, tasteless, skeletal film structure resistant to high temperatures.

It is another object of this invention to produce new types of flour from which any of the foregoing new food products might be manufactured.

It is another object of this invention to produce a new type of dough having a widely varying flour content and having a viscosity variable through a large range independently of the flour content.

It is still another object of this invention to provide a rapid, continuous, and low cost process of manufacturing food products which are supported in a thin, hard gel framework.

It is another object of this invention to produce food products through the use of a process wherein a passenger gel is utilized, with the gel characteristics substantially disappearing from the cooked food product.

It is another object of this invention to manufacture farinaceous and proteinaceous food products having a preselected nutrition value which is variable over a wide range.

It is another object of this invention to instantaneously produce a dessert jelly without heating by a new process.

It is another object of this invention to produce gels which may be frozen and thawed without breaking up.

In the final step in the preparation of potato chips, the sliced potatoes are fried by submersion in hot oil. This step is commonly known as deep-fat frying and usually takes place at temperatures between 300-390° F. The slices are dropped into the oil at the top temperature and the sudden heating causes the elimination of water as steam with explosive force and the eventual replacement of approximately half the original water content by oil. The fibrous cell structure of a natural potato is strong enough to stand this disruptive force as well as the violent shocks due to the turbulence of the boiling mass without shattering although considerable distortion does take place. As indicated above, previous attempts to prepare artificial potato chips have failed because synthetic mixtures based on starchy products did not have sufficient cohesion to produce thin slices of sufficient strength to withstand either the disruptive explosive effect of the steam or the shattering force resulting from the turbulence of the boiling mass. All such mixtures are form-less pastes and not structural forms.

I have found that it is possible to provide a mass which can be used as a base to prepare crisp, thin wafers or chips similar in appearance to natural potato chips through the use of a structural form based on a non-starchy element which even in low concentrations forms a rigid structure with water. This rigid structure or mass is capable of holding without loss of form and at high temperatures not only large amounts of water but also relatively large amounts of starches, proteins and the like which may be dispersed therein. Such a structure is created by forming a water gel which incorporates starches, farinaceous flours, meats, fish, berries, fruits, vegetables and similar foodstuffs within itself but which does not depend in any way upon such substances for viscosity, body or strength. As a matter of fact, this invention makes possible the preparation of a wafer or chip consisting solely of the material of the structure itself; such a chip would be light, relatively colorless and relatively tasteless.

By treating certain water soluble colloids with certain additives in a particular manner in successive steps at room temperatures or below, it is possible to form an initial product which is a viscous, semi-gel like substance which by itself may be readily formed or extruded and which futhermore can hold given amounts of various foodstuffs of the class indicated, more or less powdered, granulated or comminuted. This viscous, semi-gel like substance is, however, in itself quite as unfit to withstand the temperatures and the turbulence of a deep-fat bath as the gelatinous mixtures of the prior art.

I have found that by further treatment with a gelation agent this viscous semi-gel like substance can be converted into an advanced gel having the desired properties as regards viscosity, body and strength to yield a product comprising a rigid gel structure which can be cut or sliced to any desired thickness, shape or form and can be subjected to the temperatures and the turbulence of a deep-fat bath without loss of form and shape.

By the term, semi-gel like substance, I mean a water solution which forms a transparent, highly viscous, elastic, thixotropic mass, that is, more or less fluid when agitated but which becomes solid upon standing and which, if broken up will reform upon further standing. It tends to liquify or disintegrate upon heating; in its semi-solid form it is somewhat difficult to slice as the cut surfaces have a tendency to stick to one another as well as to the slicing device. Thin slices thereof do not have sufficient strength to retain their original form and cannot be manipulated or handled without collapsing or liquifaction because of their thixotropic nature. A semi-gel like substance does not eliminate water without change or collapse of the gel structure. It may be forced through or extruded from a tube in the form of a fine film.

By the term advanced or fully formed gel or coagulum I mean a firm, rigid but relatively brittle gel structure which cannot be forced through or extruded from a small opening or narrow slit as a continuous film. It is broken up by agitation or stirring and will not coalesce and re-form upon standing. An advanced gel may be readily sliced producing slices with shiny surfaces which do not tend to stick to one another. It is opaque and subject to syneresis, that is, to the separation of water without loss of form or shape. In other words, an advanced gel will eliminate water without loss of gel structure.

From the above, it will be obvious that a semi-gel like substance is not suitable for frying and that an advanced gel is not suitable for proper mixing or forming. Therefore, for the successful production of thin wafers or chips, both forms must be used at the proper stages in the process.

The invention therefore resides in a novel method by means of which an ordinary thixotropic semi-gel like substance containing a proper dispersion of the desired foodstuffs and which, contrary to ordinary practice, instead of being prepared at higher temperatures has been prepared at temperatures no higher than ordinary room temperatures, or even at temperatures approaching 32° F., is subsequently converted within the same temperature range into a firm, advanced gel structure by means of a delayed controlled treatment with a gelation agent which reacts by preference with elements already present in the thioxotropic semi-gel like substance.

According to the new process, as adapted to the production of wafers or chips, a thixotropic semi-gel like substance is formed by dispersing a more or less comminuted, powdered, granulated or shredded foodstuff in a water solution of an edible hydrophilic colloid in which the dispersed foodstuff will be present as discreet particles more or less completely enclosed in a matrix of colloid gel. A suitable hydrophilic colloid is any edible natural or synthetic gel-forming material, such as gums, proteins, cellulose ethers, and the like, which can be converted, as by the action of alkaline earth metal or magnesium ions, from a thixotropic semi-gel to a firm, advanced gel resistant to higher temperatures. Such heat-resistant gels are also known to the art as heat-irreversible gels. Examples of natural products are algins, alginates, pectins, casein and the like; examples of synthetic materials are methyl cellulose, carboxy methyl cellulose, hydroxy methyl cellulose and the like.

The choice of foodstuff is wide and is not limited to potato flour but may be of any powdered, granulated, or comminuted material either fresh or dehydrated, including starchy, farinaceous powders, as corn starch, wheat or rye flour; vegetables, as corn, cabbage, beans, and peas; fruits and berries; and proteinaceous materials such as sliced or shredded fish, meat, and the like.

After the thixotropic semi-gel containing the foodstuff has been prepared and shaped it may be further processed by one of several alternative methods to bring about the conversion from thixotropic semi-gel like form to a firm advanced gel structure strong enough to withstand the frying or cooking step. One novel method which has been found to produce highly satisfactory results is to incorporate a potential gelation agent in an inert form into the semi-gel like substance at the time of its original preparation so that the gelation agent must be further acted upon before the active component will be liberated in a form which can bring about the final gelatinization. This can be accomplished by incorporating into the original mixture an insoluble salt of an edible, alkaline-earth metal, preferably an insoluble calcium salt capable of reacting in a secondary step with a suitable edible acid, or other compound to liberate soluble calcium ions at a controlled delayed rate even at low temperatures. The calcium ions function as a gelation agent. Suitable alkaline earth salts which may act as delayed gelation agents are calcium carbonate, calcium phosphates, and the like. Magnesium salts, such as magnesium carbonate, may be employed as gelation agents when hydrophilic colloids are used which form insoluble magnesium compounds with free magnesium ions. Thus, magnesium salts may be utilized with pectins and pectinates, but cannot be used with the alginates.

The thixotropic semi-gel like substance containing a dispersion of both the comminuted foodstuff and the powdered insoluble salt is then transferred to a high-speed mixer where, according to the invention, a soluble edible acid is rapidly introduced preferably as a dry powder or mixture as indicated below, so as to free the alkaline earth metal ions at a controlled, delayed rate, the said ions then acting upon the colloid to institute the gelling action or bring about conversion to a firm gel structure. Almost any edible acid is suitable, for example, citric acid, tartaric acid, phosphoric acid and the like, as well as acid salts of such edible acids.

In this stage, the thixotropic semi-gel like substance becomes a fast setting mass which is next rapidly transferred or fed into a tube with a diameter equal to the diameter desired for the finished chips. Both the length of the tube as well as the dwell-time of the material therein are determined by the rapidity of the gelling action, that is, the rate at which the ions of the gelation agent are liberated and permitted to act upon the colloid. It is essential that the gel is brought to the exit end of the tube substantially at the moment that it is converted to a firm, advanced gel. The latter is sliced as it emerges from the tube and the slice falls into or is transported to the deep-fat fryer.

The rate at which gelation takes place is important. Since the liberated ions react rapidly with the colloid as soon as they are solubilized, the rate of liberation may be controlled either mechanically by controlling the mixing rate, or chemically by the presence of buffer salts, as sodium citrate, and the like, which serve as retardants due to control of the pH. Another effective means of retarding the reaction is by lowering of the temperature and I have found that a temperature within the range 32° F.–40° F. affords a simple means of holding the action to a controlled rate.

In another method of bringing about the transformation of thixotropic semi-gel like substance to firm advanced gel, the former is prepared without admixture of an insoluble alkaline earth salt and is then fed through an extruder and a die to give it the desired form and cross-section and then through or in contact with a bath or spray of a solution containing free alkaline earth ions, that is a solution containing a suitable soluble salt, as for example, a weak solution of calcium chloride, monocalcium phosphate, and the like. The resulting firm advanced gel thus formed is then cut or sliced into the desired lengths or chips and fed directly to a deep-fat fryer. An alternative method is to incorporate the gelation agent as an insoluble salt and to subject the resultant semi-gel like substance to an acid bath or spray which will bring about substantially instantaneous conversion to the advanced gel structure.

In still another method of effecting the transformation of thixotropic semi-gel like substances to firm advanced gel, an insoluble vehicle for the polyvalent cations is incorporated into the semi-gel like substance along with an acid which is insoluble at low temperatures but soluble at high temperatures. The semi-gel like substance is then shaped and introduced into the hot frying bath where the temperature causes the acid to dissolve, freeing the cations and bringing about advanced gelatinization simultaneously with the frying.

In all of the methods of the invention, the gel is utilized as a structure forming means, and while the structure remains after the cooking operation, the gel characteristics disappear to a greater or lesser extent depending upon the particular food product being produced. Thus, while an advanced gel is formed, the gel is not the end product and may be referred to as a passenger gel.

Further objects and features of the invention will become apparent upon reference to the following detailed description and drawings, wherein Figure 1 shows a flow diagram of one embodiment of the invention;

Figure 2 shows a flow diagram of another embodiment of the invention;

Figure 3 shows a flow diagram of another embodiment of the invention;

Figure 4 shows a flow diagram of another embodiment of the invention;

Figure 5 shows a flow diagram of another embodiment of the invention;

Figure 13 shows a flow diagram of another embodiment of the invention;

Figure 14 shows a flow diagram of another embodiment of the invention;

Figure 15 shows a flow diagram of another embodiment of the invention;

Figure 6:
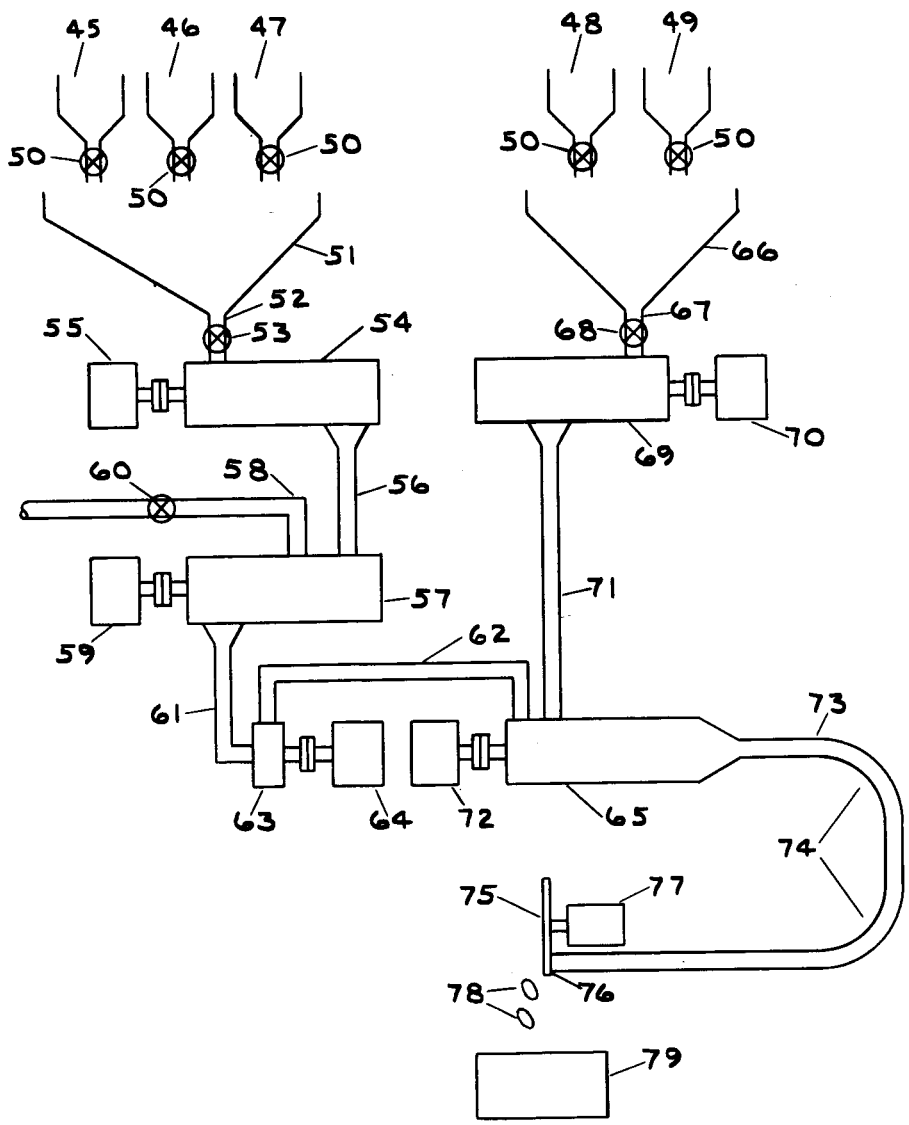
Figure 6 shows an arrangement of equipment which may be used to carry out the process diagrammed in Figure 1 on a continuous basis.

Referring now to Figure 1, there is shown one method of carrying out this invention to form a chip product utilizing calcium carbonate as the advanced gelatinization agent and starch as the food powder. The calcium carbonate, a suitable colloid, and a small percentage of the starch, all shown at 1, are mixed together in the dry state in a mixer 2. The thoroughly mixed dry powder is then transferred to a wet mixer 3 and water 4 is mixed with the powder. Whereas starch possesses to a certain extent the characteristic tendency of starchy food powders to absorb water and swell to form a sticky soft paste, I have found that no difficulty is experienced in mixing the powdered starch, calcium carbonate and colloid if a sufficiently large volume of water is used at room temperature.

Certain other food powders, however, are not so easily mixed at such temperatures because of their tendency to become hydrated and, when using such powders as potato flour and similar food products, it is necessary to employ faster mixing or a low powder-water ratio in order to avoid hydration of the flour prior to the homogeneous dispersion of the colloid. I have also found that a further solution to this problem lies in the use of low water temperatures, 32° to 40° F. having been found most satisfactory and the optimum temperature being that at which water has its highest density, i. e., 4° C., because at this temperature the water molecule is at its smallest size and is at its maximum intercellular pressure. If water absorption and swelling do occur to any considerable extent, it is impossible to homogeneously disperse the colloid and the final gel will not possess a uniform texture. A second factor which is critical and can cause difficulty at this stage of the process is the tendency of the easily hydrated colloids to form globules consisting of a large quantity of individual dry powder grains surrounded by an extremely viscous jacket of hydrated colloid particles. Once this jacket is formed, penetration of water into the jacket is impossible and, as the phenomenon is cumulative, the viscous jacket becomes thicker and thicker.

This problem was eliminated in the present process by the discovery that a uniform dispersion of colloid can be obtained if the powdered colloid is mixed with a relatively large volume of non-colloidal powder which either is highly resistant to hydration or else is completely water soluble so that each individual particle of powdered colloid is separated from the other particles and is surrounded by a substance which will allow the water to almost immediately contact it. Suitable substances for this purpose are fine sugar crystals or powder or any starch powder and these are used in a quantity equal to from 5 to 50 times the weight of the colloid. The foregoing difficulty is further alleviated by the use of low temperatures and fast mixing.

The presence of any substantial free calcium in the water used for the colloid solution will cause immediate precipitation of the colloid, and where such calcium is found, buffers such as sodium acetate, monosodium or trisodium phosphate may be used to cause its precipitation. Since the calcium carbonate which is introduced is insoluble in water and has no intermediate effect on the colloid, it is possible to add high concentrations in order to obtain the desired rate of gelatinization at the preselected time. The viscosity of the semi-gel like substance is controlled solely by the concentration of the colloid and not by the concentration of the food powder so that it is possible to form viscous semi-gel like substances with little or no food powder. The solidity of the hard gel will also depend upon the concentration of the colloid and upon its characteristics. Simultaneous with the mixing of the powders in a dry mixer 2 a suitable edible acid and the remainder of the starch, both shown at 7, are mixed in a second dry mixer 8. The output of this mixer and the output of the wet mixer 3 are then rapidly fed into a high speed mixer 6 where the final gelling action is instituted. In order to secure a uniform distribution of the acid in the semi-gel like substance and to secure a rapid and uniform liberation of the calcium ions throughout the semi-gel like structure, it has beeen found necessary to mix the acid with a larger volume of starch powder in order to have a large volume of powdered material for introduction into the mixer 6. Upon contact of the acid with the semi-gel like substance, the calcium ions are freed and commence to bring about a setting of the gel structure and since this action occurs rapidly, it is necessary to quickly transfer the substance 9 to a feed pipe 10 wherein the final advanced gel structure is formed. The feed pipe is of such a length that the ensuing mixture becomes an advanced gel 11 substantially simultaneously with its exit. The time that the gelling substance remains in the pipe or the time that it takes to form the advanced gel structure depends upon the concentration of the calcium carbonate in the original mixture and upon the concentration of the acid, the higher the concentration the more rapid the gelling action. At the exit of the feed pipe 10 is a slicer 12 of any suitable design which slices the hard sausage-shaped gelatinous substance, which is thereupon transported to a bath of a soluble salt of an alkaline earth metal such as a calcium chloride bath 13 which, though not essential, is desirable to insure that the slices are fully gelatinized before they are introduced into the deep fat frier. From the calcium chloride bath 13 the slices are fed to a water rinsing bath 13a to remove the excess calcium chloride ond the clean, gelatinized slices are then fed to a deep fat frier 13b.

Figure 9:
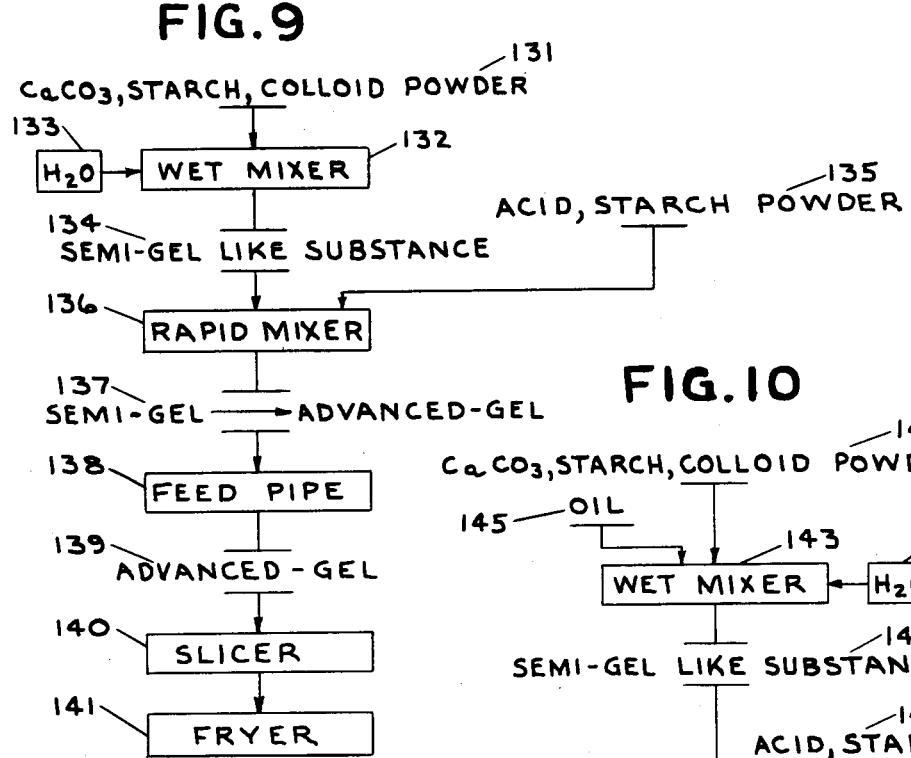
Figure 9 shows a flow diagram of another embidoment of the invention.

In Figure 9, there is shown a variation of the process of Figure 1 wherein the calcium carbonate, starch and colloid powders are premixed to form a new type of flour 131 which is fed directly to a wet mixer 132 where it is mixed with water 133 to form a semi-gel like substance 134. The acid and starch powders are also premixed to form a homogeneous powder 135 which is fed along with the semi-gel like substance into a high speed mixer 136 where the gelatinization process begins. While the gelling substance 137 in the rapid mixer is still fluid, it is rapidly fed into a feed pipe 138 where the advanced gel forms and is sliced upon its exit by means of a slicer 140. The thin slices are then fed into a deep fat fryer 141.

Figure 10:
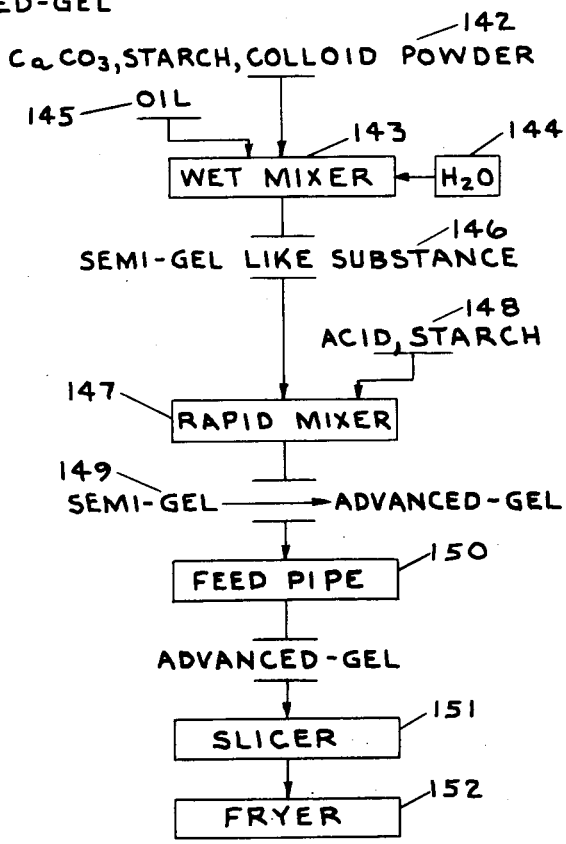
Figure 10 shows a flow diagram of another embodiment of the invention.

In Figure 10, there is shown another very important modification which might be made of the process in Figure 1. Here the calcium carbonate, starch and colloid are again premixed to form a flour 142 which is fed into a wet mixer 143 supplied by a water supply 144. I have discovered that if, simultaneously with the introduction of the flour 142, a controlled quantity of oil or shortening 145 is fed into the wet mixer to cause the formation of an emulsion rather than a water solution, many important advantages are realized.

Thus the addition of any desired quantity of oil at this stage of the process makes possible an accurate control of the quantity of fresh oil retained in the final product and effects a lubrication of the cutting implement, feed pipe and extrusion orifice. Since the oil contained in the advanced gel does not evaporate or flash into steam on introduction of the gel into the oil frying baths, a fine control of the porosity of the final skeletal structure is obtained. As little as 1 percent of fat will coat the individual granules of starch to delay or prevent their hydration, thus making homogeneous mixing of the viscous, semi-gel like substance much easier. The oil or fat in the gel lowers its specific gravity so that when the gel is sliced under water or under a solution having a similar specific gravity, the thin slices float to the surface, facilitating easy removal. The replacement of preselected amounts of water with oil in the gel formation prevents the transformation into transparent dried gel film of substantial amounts of starch particles so that the cooked chip, normally transparent, is speckled with opaque spots of ungelatinized starch in the same manner natural potato chips. Any desired type of oil, fat or shortening can be added in such amounts as to impart any particular flavor to the chips and to substantially prevent the absorption of any of the oil from the frying bath. This latter feature is important because it makes it possible to use the oil bath as a more economical evaporating and cooking medium and makes it unnecessary to maintain a critical control of the quality of the oil which has a natural tendency to become dirty and to acquire an objectionable taste after continued heating to temperatures around 400° F. The resulting chips containing the fresh oil, which has not been heated substantially over 212° F. because the chips are removed before all of the moisture is evaporated, are of a much higher quality than those which have absorbed the relatively dirty, rancid-tasting oil from the bath.

The oil containing semi-gel like substance 146 being fed from the wet mixer 143 is then fed to a rapid mixer 147 as was the case with the process of Figure 1. Also as in Figure 1, there is fed to the rapid mixer 147 an acid starch powder 148 to form the gelling substance 149 which is fed to a feed pipe 150, sliced by a slicer 151 and fed to an oil frying bath 152.

In addition to adding the oil into the wet mixer, I have found that any desired quantity of oil can alternatively be premixed with the dry powders and this preferably allowed to stand for a period of around 2 to 3 hours or more to secure maximum penetration of the oil prior to introduction into the wet mixer.

In Figure 2 is shown a further embodiment of the invention wherein the semi-gel like substance is given a slightly different treatment prior to frying. As in Figure 1, calcium carbonate, starch and a colloid are mixed in a dry mixer 14 and then fed to a wet mixer 15 wherein they are mixed with water 16 to form a semi-gel like substance 17. The semi-gel like substance 17 is then transferred to an extruder 18 which forms a very thin film 19 of the viscous substance. This extruded semi-gel like substance is transferred by means of a belt or other suitable conveyance to an acid bath 20 which brings about immediate setting of the advanced gel structure 21. This hard substance is then fed to a cutter 22 and the cut pieces dropped into a deep fat fryer 23 to produce the final crispy chip product.

Figure 3 discloses another embodiment of the invention wherein the semi-gel like substance is given a still different treatment prior to introduction into the fryer. In this embodiment, the calcium carbonate, starch and colloid are again mixed in a dry mixer 24, transferred to a wet mixer 26 and mixed with water 25 to form a semi-gel like substance 27. This viscous substance is then fed to an extruder 28 which has mounted at its outlet a cutter 29 which is arranged to cut the thin semi-gel like substance under an acid bath or a flow of acid solution.

From the foregoing three embodiments, it will be apparent that the particular sequence of steps contemplated by this invention may be varied considerably so long as the ultimate purposes and the aforedescribed critical relations are borne in mind. Any mixing arrangement may be used which will bring about first the formation of a stable semi-gel like substance and second, the formation of a uniform hard gel structure.

Bearing in mind the characteristics of a semi-gel like substance and of an advanced gel and the pitfalls to be avoided in mixing, it would be impossible to simultaneously mix the food powder, colloid, insoluble polyvalent metal ion, acid and water in one operation because the acid would immediately free the metal ions, and cause either an immediate precipitation of the colloid or instantaneous formation of an advanced gel structure while in the mixer. The gelatinization action in that event would not be uniform because there would be no uniform distribution of the acid, and some portions of the substance would set prior to others only to be broken up by the mixer to form a heterogeneous aggregate of various sized small pieces of disintegrated advanced gel which will not reset upon standing. On the other hand, it is possible to so mix the ingredients if there is incorporated therein a buffer which slows the gelification reaction sufficiently to allow the starch and colloid to be homogeneously dispersed prior to setting of the advanced gel. While this mode of operation is very critical in operation due to the necessity of maintaining an accurate control on the concentration and characteristics of the buffer and reacting ingredients, it is nevertheless a possible mode of operation within the scope of my invention.

It will also be apparent that according to the foregoing criteria dry calcium carbonate can be mixed with dry colloid and the ensuing mixture added to water to form a solution. Dry acid can simultaneously be mixed with food powder and this mixture introduced into the water solution in a high speed mixer. Gelatinization will occur rapidly and the substance has to be quickly fed through a feed pipe as shown in Figure 1. A second satisfactory variation in the mode of mixing the necessary ingredients is to mix dry calcium carbonate, colloid and starch, and to form a water dispersion of these ingredients. Simultaneously, potato flour can be mixed with dry acid and this can be subsequently mixed with the water dispersion in a high speed mixer to be then fed to a feed pipe as shown in Figure 1. A still further variation comprises premixing the water and colloid to form a colloidal solution into which the calcium is subsequently introduced. As will be recognized by one skilled in the art, there are other combinations which may be utilized to bring about the sequential formation of a stable semi-gel like substance and an advanced gel structure, all of which combinations are within the scope of the present invention.

Figure 4 discloses a further embodiment of the invention wherein starch and a colloid, both shown at 31, are mixed in a dry mixer 32 and then fed to a wet mixer 33 wherein water 34 is introduced to form a semi-gel like substance 35. It will be noted that no insoluble polyvalent metal salt is introduced in this embodiment of the invention. The semi-gel like substance 35 is fed to any suitable extruder 36 to form a thin film which is fed to a bath 37 containing a soluble salt of a polyvalent metal such as calcium chloride. The free calcium ions immediately react with the semi-gel like substance to bring about the formation of an advanced gel 38, which is then fed to a cutter 39, to a water rinse 40, and thence to a deep fat fryer 40a.

Figure 11:
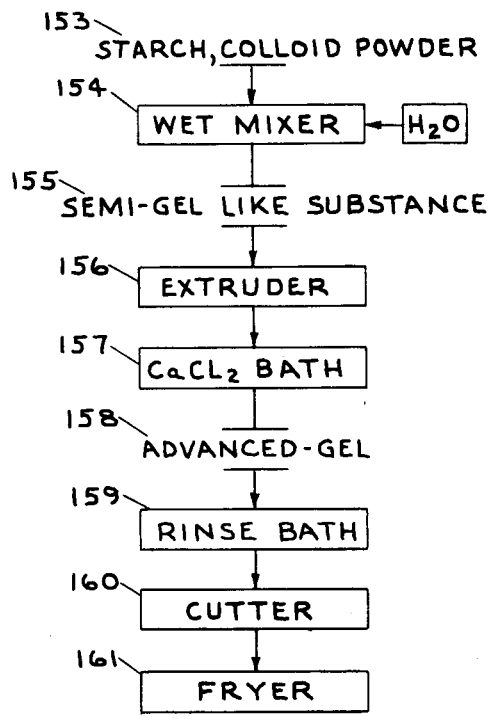
Figure 11 shows a flow diagram of another embodiment of the invention.

Figure 11 discloses a variation of the process shown in Figure 4 wherein the starch and colloid are premixed and the advanced gel emerging from the calcium chloride bath is given a water rinsing to remove the excess calcium chloride solution on the face of the gel. In this modification, a starch and colloid mixture 153 is fed to a wet mixer 154 to form a semi-gel like, viscous substance 155 which is then extruded in an extruder 156 and fed to a calcium chloride bath 157. Under the influence of the free calcium ions in the bath, an advanced gel 158 is formed which is then rinsed in a water bath 159 and the rinsed product cut by a cutter 160 and the cut pieces fried in a fryer 161.

In Figure 5 is shown a still further embodiment of the invention wherein a semi-gel 41 is formed from starch and a colloid as in Figure 4. The semi-gel 41 is then introduced into an extruder 42 which has mounted at its outlet end a cutter 43 which operates under a bath or shower of a soluble salt of a polyvalent alkaline earth metal. The semi-gel like substance is almost immediately transformed into an advanced gel under the action of the polyvalent metal ions and the thus gelatinized slices are then fed to a deep fat fryer 44.

In all of the embodiments of the invention where a gelling bath or shower is used, it has been found advantageous to maintain such bath at a high temperature, i. e., almost boiling, as this will not only diminish the flashing action in the hot fat but will also reduce the amount of cooking necessary.

The following are several examples of the foregoing processes as applied to the manufacture of synthetic potato chips:

*Example No. 1.*—Chips were made using the following materials:

|  | Grams |
|---|---|
| Algin | 1 |
| Citric acid | 0.5 |
| Calcium carbonate | 0.12 |
| Water | 100 |
| Starch | 25 |

One gram of a standard algin of light or medium viscosity was mixed with 0.12 gram of calcium carbonate and 12 grams of starch. The remaining 13 grams of starch were thoroughly mixed with 0.5 gram of citric acid, both of the foregoing mixings being performed dry. 100 grams of water at room temperature were placed in a high speed mixer and the mixture of algin, calcium carbonate and starch added. The mixing action was allowed to continue for two to five minutes, and while the mixer was still running, the dry mixture of starch and citric acid was rapidly poured in. The mixer was run for five to ten more seconds, and while the mixture was still in a semi-fluid state, it was poured into a feed pipe. The semi-fluid mixture formed an advanced gel within two to ten minutes and at that stage it was possible to slice the material into thin slices. The material was forced through the feed pipe by an impeller on the inlet end and the sausage-shaped material being forced from the outlet of the pipe in a fully gelatinized state sliced into thin discs. The thin slices were dropped directly into a hot fat bath where they were cooked at a temperature starting at 390° F. and ending at 360° F. The gelled slices immediately prior to frying contained twenty percent starch.

*Example No. 2.*—The procedure of Example No. 1 was repeated except that only 11 grams of starch were used with 5 grams being mixed with the calcium carbonate and colloid and the remaining 6 grams being mixed with the citric acid. The gelled slices immediately prior to frying contained ten percent starch.

*Example No. 3.*—The procedure of Example No. 1 was repeated except that only 5.2 grams of starch were used, 2 grams being mixed with the calcium carbonate and the algin, and the remaining 3 grams being mixed with the citric acid. The gelled slices immediately prior to frying contained five percent starch.

*Example No. 4.*—Chips were made using the following ingredients:

| | Grams |
|---|---|
| Algin | 1 |
| Calcium carbonate | 0.12 |
| Potato flour | 12.5 |
| Starch | 12.5 |
| Citric acid | 0.5 |
| Water | 100 |

One gram of a light viscosity algin was mixed with 0.12 gram of calcium carbonate and 12.5 grams of starch. Simultaneously, 12.5 grams of potato flour were separately mixed with 0.5 gram of acid. 100 grams of water at room temperature were placed in high speed mixer and the dry mixture of algin, calcium carbonate and starch added and mixed for about two to five minutes. At that time, the mixture of potato flour and acid were rapidly added and mixed for 5 to 10 seconds, and while still in a semi-fluid state, the contents of the mixer were immediately transferred to a feed pipe. As in Example No. 1, the sausage-like output of the feed pipe was sliced and dropped into a deep fat bath where the cooking temperature was 380° F. at the start and 300° F. at the finish. The gelled slices immediately prior to frying contained ten percent potato flour.

*Example No. 5.*—Chips were made using the following ingredients:

| | Grams |
|---|---|
| Algin | 1 |
| Calcium carbonate | 0.12 |
| Potato flour | 25 |
| Citric acid | 0.5 |
| Water | 100 |

One gram of a light viscosity algin was mixed with 0.12 gram of calcium carbonate and 10 grams of potato flour. Simultaneously, the remaining 15 grams of potato flour were mixed with 0.5 gram of citric acid. 100 grams of water at a temperature between 39° F. and 42° F. were placed in a high speed mixer and the mixture of algin, calcium carbonate and potato flour added and stirred rapidly for about two minutes. The mixture of potato flour and acid was then rapidly added, mixed for three to five seconds and poured immediately in a semi-liquid state into the feed pipe. The procedure of Example No. 1 was again repeated as to the slicing and frying with the cooking temperature ranging between 380° F. to start and 280° F. to finish. The gelled slices immediately prior to frying contained twenty percent potato flour.

The mixing of the potato flour, algin and calcium carbonate with the water is much more critical than the mixing of a starch-containing mixture because of the extreme tendency of the potato flour to swell and form a hard paste before enough time has elapsed for the colloid to be homogeneously dispersed and acted upon by the water. At room temperature, it is difficult to mix even five grams of potato flour with 100 grams of water because after two minutes of mixing, the potato flour becomes hydrated and forms a very viscous mass which makes it extremely difficult to homogeneously mix in the remainder of the potato flour and the acid. The mixing can, however, be carried out at room temperature if the mixer is of the high-speed type and the amount of potato flour is kept small, such as 5 grams or less per 100 grams of water. If such a high-speed mixer is not available, it is better to prepare a solution of the algin in water in advance and then to add the potato flour. Of course, this problem is eliminated if the procedure illustrated in the present example is followed and the temperature of the water maintained at 42° F. or below. Another expedient which is helpful in preventing the formation of such troublesome viscosity is to maintain the potato flour itself at as low a temperature as possible prior to the mixing, experience having shown that with potato flour at room temperature and water at about 37° F., no difficulty is encountered. A further important aid in such mixing is the previously mentioned method of adding oil to form an oil emulsion and coat the starch particles.

*Example No. 6.*—The procedure of Example No. 1 was repeated except that the 1 gram of algin was replaced with 1 gram of a low methoxyl group pectin produced by the Unopectin Corporation of Zurich, Switzerland, under the trade name of "Red" Pectins.

*Example No. 7.*—The procedure of Example No. 1 was repeated except that the 1 gram of algin was replaced with 1.75 grams of a low methoxyl group pectin manufactured by the Sun Kist Corporation of Florida. The specific pectins are herein identified as to manufacturer because I have found that commercial pectins have varying methoxyl group contents which makes it necessary to adjust the amount which is used according to the percentage of purity of the product.

*Example No. 8.*—The procedure of Example No. 1 was repeated except that after slicing the gelatinized slices were passed through a 1% solution of calcium chloride for 1 minute and were then passed through a water rinse bath prior to frying.

While the foregoing chemical ratios are not in all instances stoichiometrical they have been found practical and satisfactory.

A review of the foregoing examples readily demonstrates that the processes of the present invention are not limited to any specific concentration of food powders. If it is desired to reproduce as nearly as possible a natural potato chip, then 20% of starch should be used as this is the amount present in a raw potato. This amount may be reduced all the way down to zero where a tasteless, colorless, nutritionless chip would be formed, and up to percentages around 90%, the upper percentage being limited only by the amount of insoluble polyvalent metal salt, colloid and acid which are necessary and by the type of product which is sought. The product produced in this wide range will vary all the way from a nutritionless, crispy, gelled water chip to a highly nutritious cookie, the use of high percentages of food powders causing absorption of water to form a heavy dough which on cooking is more cookie-like than chip-like due to the absence of water created voids. The ability to make tasty cripy food products with a low nutritional value opens wide possibilities in the way of dietary food products.

The amounts of algin, calcium carbonate and acid may also be varied, bearing in mind: that the concentration of algin determines the viscosity and character of both the semi-gel like substance and of the hard gel, approximately 0.75 gram per 100 grams of water being the minimum satisfactory amount; that the concentration of the calcium carbonate is determined by the amount of algin which it must gelatinize and by the degree of gelatinization desired; and that the concentration of acid is determined by the amount of calcium carbonate to be solubilized and by the rate of solubilization desired, the lower limits of these three compounds which will yield satisfactory chips being approximately 0.75 gram of algin, 0.09 gram calcium carbonate and 0.375 gram of citric acid per 100 grams of water. The corresponding amounts of different colloids, insoluble alkaline earth salts and acids can readily be calculated by conventional methods.

In Figure 6 of the drawings is shown a lay-out of equipment which may be used to carry out the processes of Examples Nos. 1, 2 and 3, on a continuous basis. A plurality of hoppers 45, 46 and 47 are provided for receiving the starch, calcium carbonate, and algin powders respectively. A second group of hoppers 48 and 49 is provided to receive the acid and starch powders respectively. Each hopper is equipped with a valve 50 for regulating the flow of the powdered material. Beneath hoppers 45, 46 and 47 is a chute 51 having a feed pipe 52 and a flow valve 53. The powder ensuing from feed pipe 52 is fed into a dry mixer 54 of any suitable type driven by a motor 55. The output of mixer 54 is fed by means of pipe 56 to a wet mixer 57 of any suitable variety having a water inlet line 58 and a driving motor 59, the flow of water being regulated by means of the valve 60. On mixing the starch, calcium carbonate and algin with the water in the mixer 57, a semi-gel like substance is formed which is fed through pipe 61 and pipe 62 by means of a pump 63 driven by a motor 64 into a master mixer 65.

Beneath the hoppers 48 and 49 is located a chute 66 having a feed pipe 67 and a flow valve 68 which regulates the flow of material from the chute 66 into a dry mixer 69 driven by a motor 70. The output of mixer 69 is delivered by means of a pipe 71 into the master mixer 65 which is simultaneously receiving the semi-gel like substance. Gelatinization begins to occur at the point of introduction into the master mixer 65, and the still semi-gel like mixture is forced by means of a screw or other suitable means in the mixer 65 into a final feed pipe 75. It must be realized that at the point of entrance into the feed pipe 73, the substance is still in a semi-gel like state and that it is progressing toward the advanced gelatinous state during its progress through the pipe. While the substance is in such a semi-gel like state, it may be carried through bends in the pipe as at 74, but as it advances toward the final hard gel, the pipe must be straight in order to avoid a breaking up of the gel structure. A rotating knife 75, preferably of the type utilizing a taut wire as the cutting edge, is mounted at the end 76 of the feed pipe 73 and is driven by a motor 77. The sausage-like advanced gel ensuing from the end 76 of the feed pipe 73 is sliced by the rotating knife 75 into very thin chips 78 which threupon are dropped into the hot fat bath 79 to be fried. It will be readily apparent that the foregoing equipment could with little alteration so form the semi-gel like substance as to form French fries.

Figure 7:
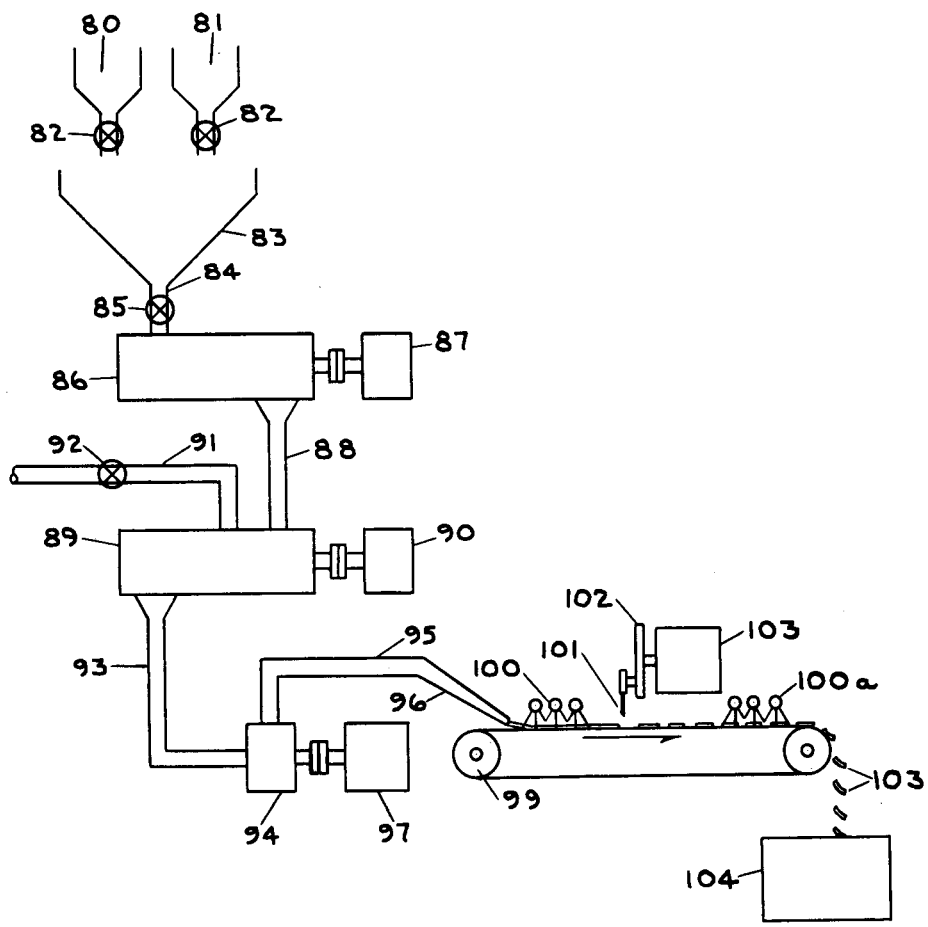
Figure 7 shows an arrangement of equipment which may be used to carry out the process diagrammed in Figure 4 on a continuous basis.

In Figure 7, there is shown a second lay-out of equipment suitable for carrying on the process of Figure 4 in a continuous manner. A pair of hoppers 80 and 81 provided with feed valves 82 are mounted above a chute 83 having a feed pipe 84 and feed valve 85 to regulate the flow of powder to a dry mixer 86 driven by a motor 87. The output of the mixer 86 is fed by means of a pipe 88 to a wet mixer 89 driven by a motor 90 and supplied with water by means of a pipe 91 having a flow valve 92. The semi-gel like output of the mixer 89 is drawn through pipe 93 by means of a pump 94 and is then fed through a feed line 95 to an extrusion die 96. The thin extruded film emanating from the extrusion die 96 is delivered onto a belt 98 mounted on rollers 99. Removed slightly from the extrusion die 96 in the direction of travel of the belt 98 is one group of spray pipes 100 which supply a fine spray of gelling agent to cause advanced gelatinization of the material on the belt 98, and still further along the belt is a second group of spray pipes 101a which supply a fine spray of rinsing water. Between the spray pipes 100 and 100a is located a reciprocating cutter knife 101 carried by a crank 102 driven by a motor 103. As the extruded material passes under the cutter blade 101, it is divided into pieces of the desired size, and on reaching the end of the belt 98, these pieces 103 drop into the deep fat fryer 104.

The spray of gelling agent could readily be replaced with a gelling agent bath and for this purpose a ¼% to 3% solution of, for example, calcium chloride or a ½% to 5% solution of calcium lactate has been found satisfactory. Such a solution will transform the film to an advanced gel in from ten seconds to a few minutes, the time depending upon the concentration of the calcium chloride or of the calcium lactate and on the concentration of the colloid.

In such a process where the material is treated with calcium chloride or similar source of polyvalent metal ions it is desirable, although not necessary, to rinse the excess calcium chloride or other solution from the surface of the material prior to the frying operation. Such rinsing can either be performed in a water bath or by means of a water spray.

Figure 8:
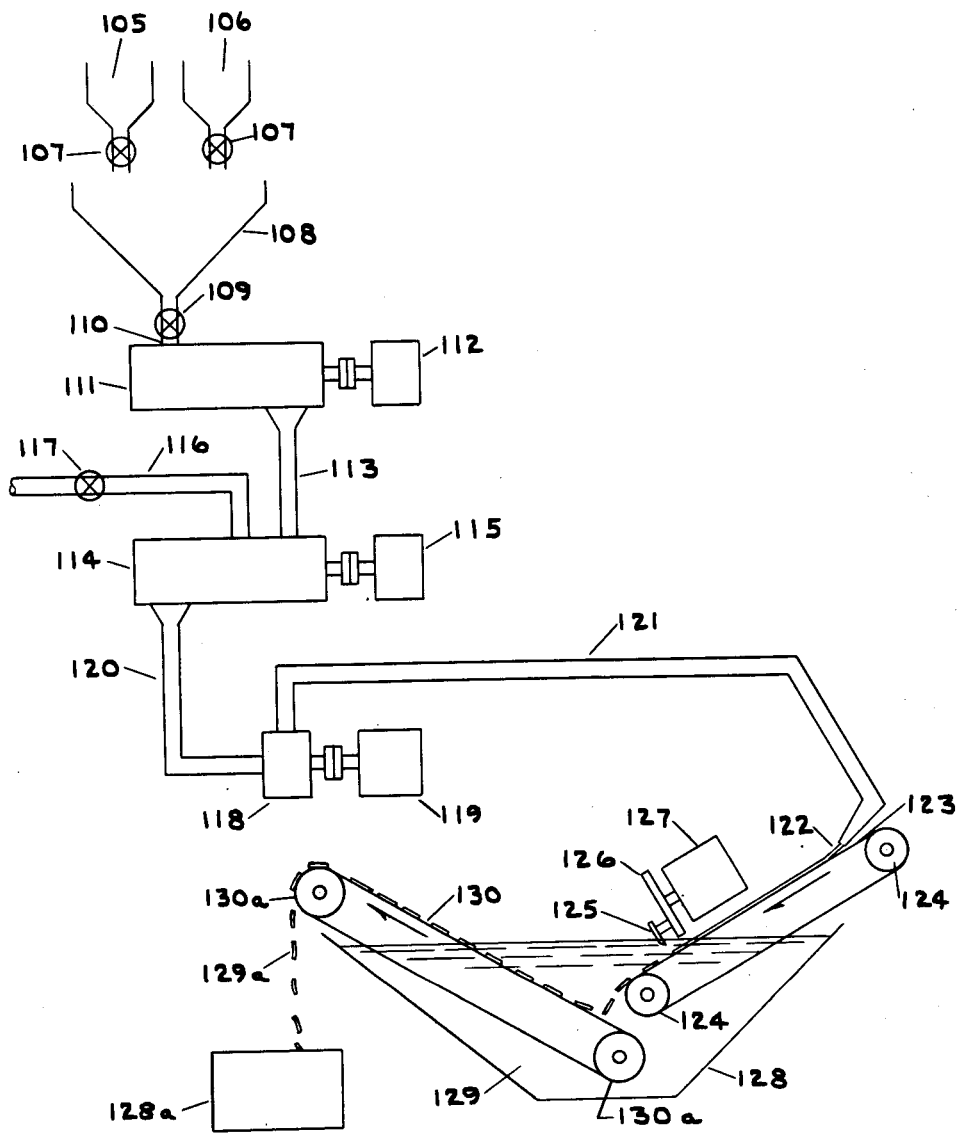
Figure 8 shows an arrangement of equipment which may be used to carry out the process diagrammed in Figure 5 on a continuous basis.

In Figure 8 is shown a lay-out of equipment which may be used for causing advanced gelatinization of the material substantially simultaneously with the cutting thereof, as is disclosed in the process of Figure 5. A pair of hoppers 105 and 106 having control valves 107 is mounted above a chute 108 having a valve 109 and feed pipe 110 which feeds the powder into a dry mixer 111 driven by a motor 112. The output of mixer 111 is fed by means of pipe 113 into a wet mixer 114 driven by a motor 115 and receiving water from a pipe 116 having a flow valve 117. The semi-gel like output of the mixer 114 is fed by means of a pump 118 driven by a motor 119 through lines 120 and 121 to an extrusion die which deposits the extruded semi-gel like substance on a conveyor belt 123 mounted on rollers 124. The conveyor belt 123 extends into a tank 128 and below the surface of a bath of gelatinizing fluid 129 contained therein. Near the lower end of the belt 123 is mounted a cutter blade 125 mounted on a crank 126 driven by a motor 127. The cutter divides the film on belt 123 and the pieces are then dropped onto the lower end of a second conveyor belt 130 mounted on rollers 130a. The fully gelatinized pieces 129a are then fed to a hot fat bath 128a where the pieces of food are fried.

Figure 12:
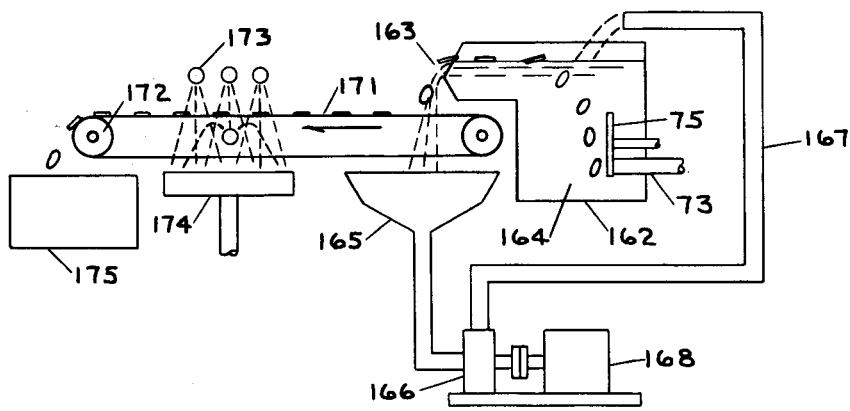
Figure 12 shows an arrangement of apparatus which might be used to remove the gel slices from the gelling agent bath.

In Figure 12, there is shown a variation of the equipment shown in Figure 6. In this modification, the gelatinized substance ensuing from the pipe 73 in Figure 6 is sliced under a gelling agent bath 164 in a tank 162 to insure one hundred percent gelatinization of the slices. The tank 162 has a weir edge 163 over which the solution of a gelling agent 164 spills into a pan 165. The liquid is removed therefrom by a pump 166 and pumped through line 167 back into the tank 162 at its upper right hand edge. Immediately beneath the weir 163 is located a foraminous conveyor belt 171 driven by rollers 172. A series of water spray pipes 173 delivering a stream of water over belt 171 and into a catch bucket 174 is provided between the rollers 172. Immediately beneath the leftmost roller 172 is the frying bath 175. The solution of gelling agent 164 in this embodiment has added thereto a specific gravity increasing agent such as ordinary salt which is dissolved in the gelatinization bath to cause the slices of gel to rise to the surface whereupon they flow over the weir edge 163 onto the belt 171, which carries them beneath the rinsing water from pipes 173 and into the fryer 175. The use of such a novel gelatinization bath greatly facilitates the removal of the slices.

In the manufacture of conventional potato chips the usual process calls for washing the sliced chips prior to introduction in the hot fat bath in order to remove small external particles of starch and to prevent the slices from sticking together. This operation has been found unnecessary in the new process because of the inherent characteristic of advanced gel structures to exude a small amount of moisture substantially continuously for a period of 48 to 72 hours. This seepage action not only prevents sticking on introduction into the fat bath but also makes it possible to prepare the hard gel slices in advance of the frying and to package them in any suitable container for storage or transportation. The slices may be packaged and sold in the gelatinous state to be subsequently fried at any desired time within a certain time limit. This water expulsion phenomenon is most marked at the instant that the calcium ions are freed and the gelling is instigated, the viscous substance at that stage contracting and losing as high as approximately 10% of its water. This action is taken advantage of in the slicing below a gelling agent bath because here a certain amount of the gelatinization occurs simultaneously with the cutting and at that very moment a large amount of the water is exuded to lubricate the cutting implement.

Important among the many substantial advantages of the present invention is the fact that the food products are fried in a bath in which no part of the product is soluble and in which neither water nor water solubles will dissolve. As a result the food product may be enriched with a wide variety of substances, anything in fact which is not soluble in the frying bath.

Whereas the foregoing embodiments of the invention have been disclosed in the preparation of starchy food products, the novel skeletal gel structure may be used for supporting other non-starchy foods of an extremely wide variety.

In Figure 13 there is shown an embodiment wherein a mixture 176 of colloid and meat powders is mixed with water in a wet mixer 177 which delivers a semi-gel like substance 178 to an extruder 179. The semi-gel like substance issuing from the extruder 179 is fully gelatinized and cut under a calcium chloride bath 180 and the pieces there formed are rinsed under a water bath 181 and are thence fried in a fryer 182. It will be apparent that meat and fish chip products can also be formed according to the process shown in Figure 1.

In addition to being useful with non-starchy food powders in a process such as that illustrated in Figure 13, the invention can also be used in the preparation of various other types of meat and fish products. Thus, according to the invention meat cakes, meat loaves, hamburgers, fish cakes, etc., can be prepared with a widely variable food content.

In Figure 14 there is shown a method of preparing hamburger by feeding a mixture of colloid and ground meat 183 and oil 183a into a wet mixer 184 where a semi-gel like emulsion 185 is formed. This viscous substance 185 is then fed to a suitable forming machine 186 which forms the hamburger patties, which are then fed to a calcium chloride bath 187 to cause gelatinization. The excess calcium chloride is rinsed off in a water bath 188 and the hard advanced gel patties are cooked on a grill 189 of any suitable type. In this embodiment, as in all others, it is possible to vary the amount of food product (meat) used in preparing the finished food.

While the foregoing processes which have utilized starchy foods have all culminated in a frying step, it will be readily appreciated that a baking or other cooking step could be used to form new types of dough products such as breads, cookies, biscuits, or similar types of products.

In Figure 15 there is shown a process for making cookies wherein a mixture 190 of starch, calcium carbonate, and colloid powders is fed to a wet mixer 191 which also receives a supply of oil 191a to form an emulsified semi-gel like substance 192. This semi-gel like substance is then mixed in a rapid mixer 193 with a starch, acid powder mixture 194 to institute the gelatinization action. While this substance 195 is still in a liquid form it is fed into a feed pipe 196 to become an advanced gel 197 which is sliced by a slicer 198 at the outlet end of the feed pipe. The sliced substance forms cookies which are fed by any suitable conveyor means to an oven 199 where they are baked.

Whereas in all of the foregoing illustrations of my invention advanced gelatinization has been brought about at some time prior to the cooking operation, I have discovered that it is also possible to bring advanced gelatinization about at the precise moment of cooking, or at least at the time that the food particle is exposed to the high temperatures of the cooking apparatus. When utilizing this type of process, the entire food mass may be prepared in one step, i. e., all of the dry ingredients may be mixed together into a pre-prepared flour and then in one operation this flour may be mixed with water. Since advanced gelatinization does not occur until the high temperatures of cooking are encountered, there is an opportunity for bread or cake products to rise or expand under the influence of a leavening agent such as yeast or baking soda, so that it is possible to prepare a wide variety of products such as pancakes, waffles, souffles, doughnuts, etc.

According to this embodiment of the invention, a calcium compound is utilized which is substantially insoluble in water at either high or low temperatures and the calcium ion is solubilized by an acid which is substantially insoluble in room temperature water but is soluble in hot water. Thus the calcium ions are not liberated until the cooking temperature has been reached and sufficient time has been allowed for any desired degree of expansion to occur. The expression "substantially insoluble" as used herein is intended to include such compounds as calcium carbonate and tricalcium phosphate which are usually regarded as completely insoluble in water, as well as compounds which have a very slight solubility in water, such as dicalcium phosphate. These salts may be used either alone or in combination to supply calcium ions for gelatinization in the manner more fully described hereinafter.

Figure 16:
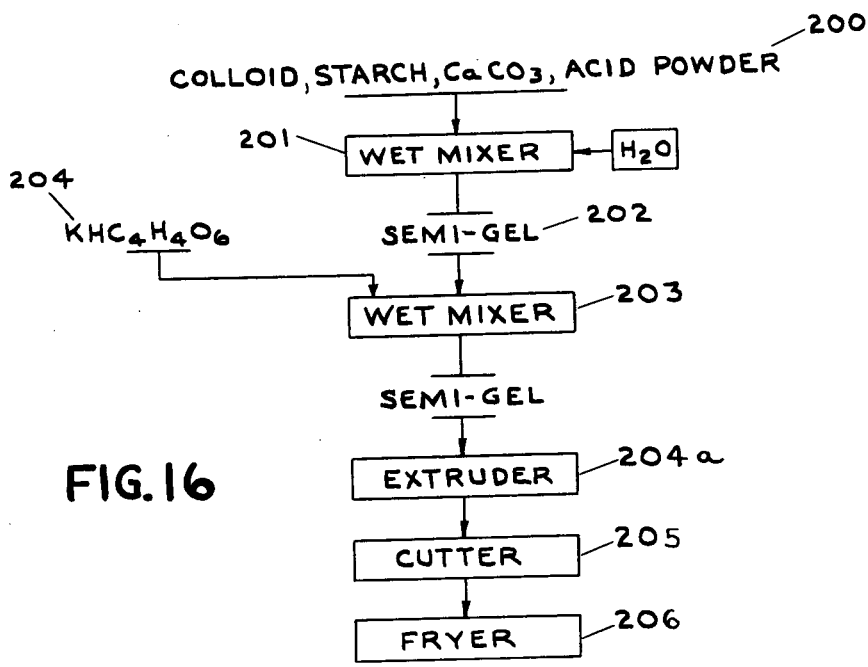
Figure 16 shows a flow diagram of another embodiment of the invention.

In Figure 16 is shown one embodiment of this facet of the invention wherein a mixture 200 of colloid, starch, calcium carbonate and acid powders is fed to a wet mixer 201 to form a semi-gel like substance 202. Less acid is used in this embodiment than in the preceding embodiments because it is desired to liberate only a small percentage of the calcium ions in the original wet mixing in order to prevent the formation of a true gel and to keep the ensuing mass in the form of a semi-gel or viscous mixture. This semi-gel like substance 202 is then fed to a wet mixer 203 which receives potassium bitartrate 204, the mixture remaining a semi-gel like substance because of the substantial insolubility of the potassium bitartrate in room temperature water. The semi-gel like substance from mixer 203 is then fed to an extruder 204 and thence to a cutter 205 where the desired thin pieces of material are formed. These pieces are then fed or dropped into a fryer 206 where the heat of the bath causes the potassium bitartrate to dissolve, freeing the calcium ions which causes almost instantaneous advanced gelatinization.

Figure 17:
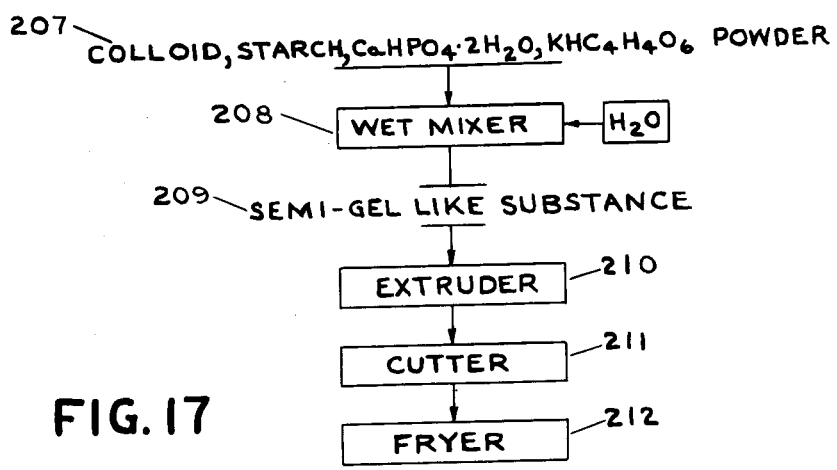
Figure 17 shows a flow diagram of another embodiment of the invention.

In Figure 17, there is shown another embodiment of the invention utilizing this new gelatinization process wherein the calcium salt used is di-calcium phosphate, which has an extremely slight solubility in both hot and cold water, and the only acid used is potassium bitartrate, which is very slightly soluble in room temperature water but highly soluble in hot water. This powdered mixture 207 may be premixed and fed to a wet mixer 208 to produce a semi-gel like substance 209, which is fed to an extruder 210 and thence to a cutter 211. The cut semi-gel like substance is then fed or dropped into a frying bath 212 where the temperature causes the potassium bitartrate to dissolve, freeing the calcium ions and causing advanced gelatinization.

The slight solubility of potassium bitartrate in cold water is sufficient to substantially increase the solubility of the di-calcium phosphate in cold water in order to give the desired viscosity to the semi-gel substance. On heating the semi-gel the solubility of the potassium bitartrate increases seventeenfold so as to cause sufficient di-calcium phosphate to dissolve to bring about advanced gelatinization.

Figure 18:
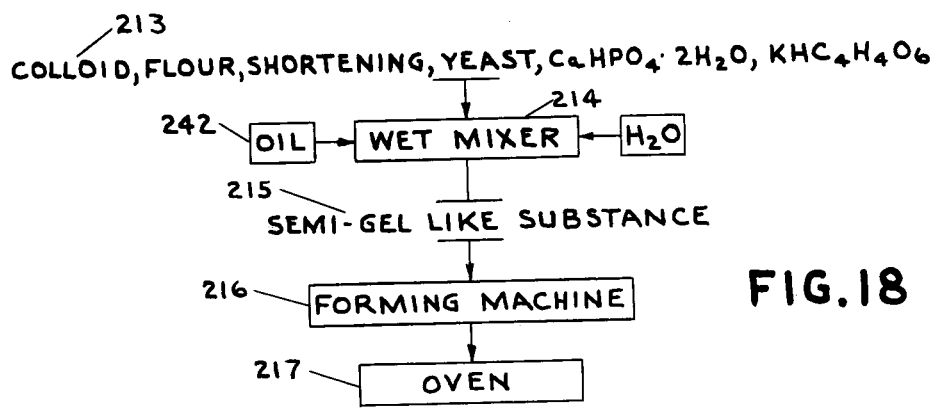
Figure 18 shows a flow diagram of another embodiment of the invention.

In Figure 18 there is shown a method of preparing bread according to this invention wherein a powdered mixture 213 of colloid, flour, shortening, yeast, di-calcium phosphate, and potassium bitartrate is fed to a wet mixer 214 which receives a supply of oil 241 to form an emulsified semi-gel like substance 215 which is formed by any suitable forming machine 216 and thence fed to an oven 217. The action of the yeast or other rising agent can occur either before the product is fed into the oven or during the beginning of the heating cycle. As in other embodiments of this invention the amount of flour used to produce the new bread may be varied over a wide range.

Following are several examples of the processes utilizing this delayed formation of the advanced gel.

*Example No. 9.*—Chips were made using the following materials:

| | Grams |
|---|---|
| Algin | 1.0 |
| Potato starch | 25 |
| Calcium carbonate | 0.12 |
| Citric acid | 0.15 |
| Water | 100 |

One gram of a standard algin of medium to high viscosity was mixed with 0.12 gram of calcium carbonate, 25 grams of starch, and 0.15 gram of citric acid. This dry mixture was then added to 100 grams of water at room temperature in a high speed mixer. 0.35 gram of potassium bitartrate was then added to this water mixture, and the resulting semi-gel like substance extruded and cooked in deep fat. The temperature of the fat bath was 380° F. to start and 280° F. at the end of the cooking operation. The gelled pieces immediately prior to cooking contained 20 percent starch.

*Example No. 10.*—The procedure of Example No. 9 was repeated except that the 0.12 gram of calcium carbonate was replaced with 0.2 gram of di-calcium phosphate. The citric acid was completely eliminated and 0.5 gram of potassium bitartrate was used.

*Example No. 11.*—Chips were made using the following materials:

| | Grams |
|---|---|
| Algin | 1.0 |
| Calcium carbonate | 0.04 |
| Starch | 25 |
| Citric acid | 0.1 |
| Potassium bitartrate | 0.45 |
| Di-calcium phosphate | 0.15 |

One gram of a standard algin of medium to high viscosity was mixed with 0.04 gram of calcium carbonate, 25 grams of starch, 0.1 gram of citric acid, 0.45 gram of potassium bitartrate and 0.15 gram of di-calcium phosphate. This dry mixture was then added to 100 grams of water in a high speed mixer and the resulting semi-gel like substance fed to an extruder and thence to a cutter. The cut semi-gel like particles were then fed or dropped into a hot fat bath wherein the particles were fried.

Figure 19:
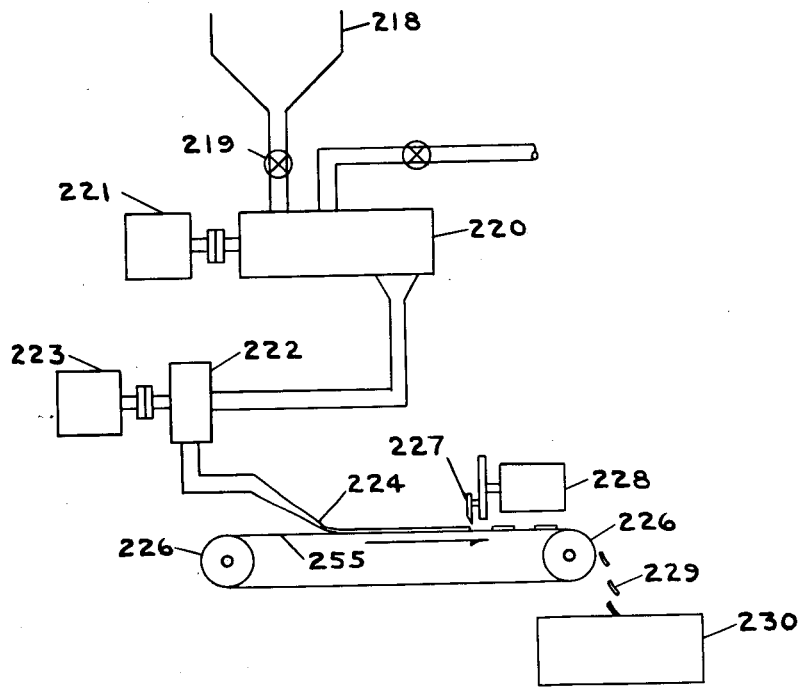
Figure 19 shows an arrangement of equiment which may be used to carry out the process diagrammed in Figure 17 on a continuous basis.

In Figure 19 there is shown an arrangement of equipment wherein the process of Figure 17 may be carried out on a continuous basis. A hopper 218 is provided for receiving the premixed colloid, starch, di-calcium phosphate, and potassium bitartrate. This dry mixture is then fed through a flow control valve 219 into a high speed mixer 220 driven by a motor 221 and the output of said mixer is delivered by a pump 222 driven by a motor 223 to an extrusion orifice 224 which delivers the extruded semi-gel like substance to a conveyor belt 225 mounted on rollers 226. The extruded material passes beneath a reciprocating cutter 227 driven by a motor 228 and the cut particles 229 are dropped into a hot fat bath 230.

Figure 20:
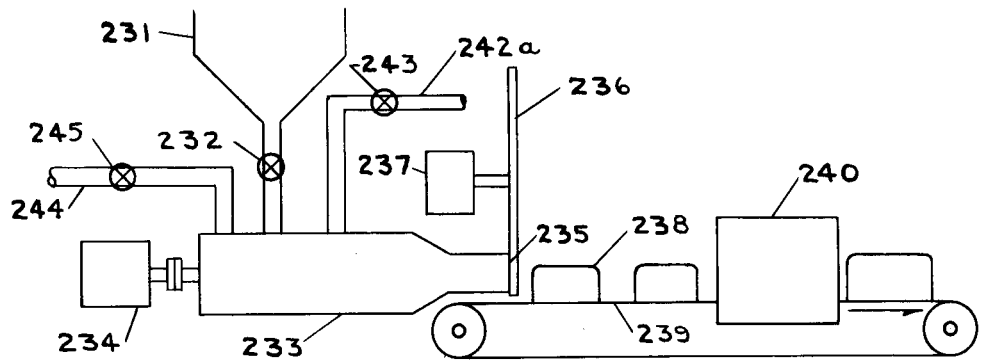
Figure 20 shows an arrangement of equipment which may be used to carry out the process diagrammed in Figure 5 on a continuous basis.

In Figure 20, there is shown an arrangement of equipment which is suitable for carrying out the process of Figure 18 on a continuous basis. A hopper 231 having a flow control valve 232 receives the premixed colloid, flour, shortening, yeast, di-calcium phosphate and potassium bitartrate, which is fed into a high speed mixer 233 driven by a motor 235. The mixer, which receives water through a pipe 242 and flow valve 243 and oil through a pipe 244 and flow valve 245, may be of the type which carries an internal screw to force the semi-gel like mixture out of an orifice 235. Located adjacent the orifice 235 is a rotating cutter 236, driven by a motor 237, which cuts the extruded material into loaves. The cut loaves 238 are thence carried by a conveyor belt 239 into any suitable oven 240 where baking takes place.

A still further novel process of this invention lies in the preparation of dessert jellies and puddings almost instantaneously without the use of heat in room temperature or even freezing temperature water. Thus it is possible to instantaneously prepare dessert jellies and puddings using ice cold water so that the jellies and puddings are immediately ready to be served. In order to prepare such a jelly according to the invention, it is necessary merely to replace the starch of the foregoing processes with sugar. Thus a dry mixture of sugar, calcium carbonate and colloid is dissolved in room temperature water and any selected fruit juice of sufficient acidity is added to cause the immediate formation of a dessert jelly.

Figure 21:
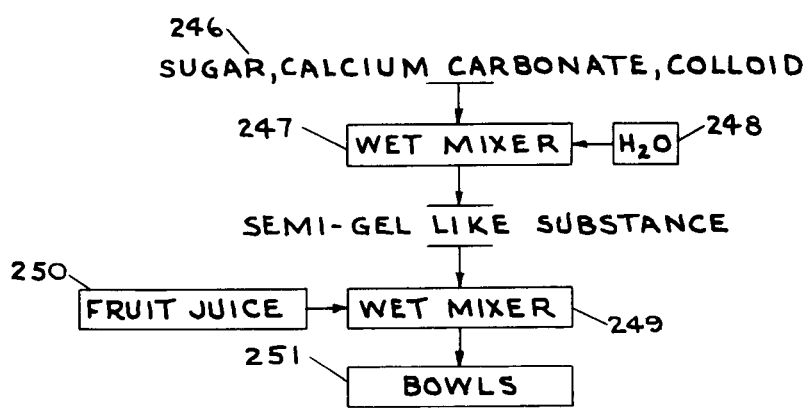
Figure 21 shows a flow diagram of another embodiment of the invention.

In Figure 21, there is shown a flow diagram of a process for producing such jellies. A dry mixture 246 of sugar, calcium carbonate and colloid is fed to a wet mixer 247 receiving room temperature water 248. The resulting semi-gel like substance is then fed to a second wet mixer 249 which a fruit juice 250 is mixed in to institute formation of a dessert jelly. Prior to the setting of the jell, the material from mixer 249 is fed to suitable bowls 251 or the like where the jell solidifies and is ready for serving.

Following are several examples of processes of forming dessert jellies:

*Example No. 12.*—A dessert jelly was made using the following ingredients:

| | Grams |
|---|---|
| Low methoxyl pectin | 2 |
| Calcium carbonate | 0.24 |
| Sugar | 20 |
| Water | 100 |
| Grapefruit juice | 100 |

Two grams of a low methoxyl pectin were mixed dry with 0.24 gram of calcium carbonate and 20 grams of sugar and this mixture added to 100 grams of room temperature water. The water was stirred until the pectin and sugar dissolved and the grapefruit juice added. This mixture was then stirred until it started to become viscous and the material then left to set to form a firm dessert jelly within a few minutes.

*Example No. 13.*—A dessert jelly was made using the following ingredients:

| | | |
|---|---|---|
| Pectin | grams | 2 |
| Calcium carbonate | do | 0.24 |
| Tri-sodium phosphate | do | 0.3 |
| Glucose | do | 15 |
| Sugar | do | 40 |
| Tartaric acid | do | 1.6 |
| Coloring | do | .005 |
| Orange flavoring | drops | 5 |
| Water | grams | 200 |

Two grams of pectin were mixed dry with 0.24 gram of calcium carbonate, 0.3 gram of tri-sodium phosphate and 15 grams of glucose, and this dry mixture added to 200 grams of water which was stirred until the pectin and glucose dissolved. Meanwhile 40 grams of sugar were mixed dry with 1.6 grams of tartaric acid, 0.005 gram of coloring and 5 drops of orange flavoring. This latter mixture was then rapidly mixed with the water solution until the sugar dissolved and the viscosity started to increase. The material was then allowed to set and quickly formed a dessert jelly. The acid was used in place of the acid of the natural fruit juice and the tri-sodium phosphate was used as a buffer to transform any free calcium in the water into an insoluble form.

Although one of the primary advantages of my invention is that it may be carried out at room temperatures or below, it must also be realized that it is possible, although more time consuming, critical and costly, to carry out the mixings at high temperatures as is done in the formation of conventional gels. Thus, while the lower temperatures are preferred in order to realize all of the advantages of the invention, it is to be understood that the scope of my invention is not to be limited to such temperatures.

Whereas conventional gels and jellies are destroyed if frozen and then thawed I have discovered a method of utilizing my new process to prepare gels and jellies which may be frozen and then thawed without losing their gelatinous character. I have found that if the wet mixing and subsequent steps in my processes are carried out at substantially freezing temperatures a gel or jelly forms which if almost immediately frozen can be subsequently thawed without destruction of the gel or jelly. It is not necessary that the freezing operation be carried out immediately as the gel or jelly can be retained for a short time at a temeprature between 0° and 4° C. prior to freezing. One especially satisfactory aid in maintaining the necessary low temperature during the gelatinization operation is to utilize powders which are at temperatures below freezing. Other obvious expedients are to use freezing water and/or a cold chamber.

Whereas this invention has been described in connection with various flours, foods, processes, and arrangements of equipment, it is to be understood that this is for illustrative purposes only and is not to be construed in any limiting sense as the invention is to be limited only by the spirit and terms of the appended claims.

I claim:

1. A process of preparing a firm crispy fried food product comprising the steps of dispersing a finely divided food in a thixotropic semi-gel comprising a water solution of a colloid, subjecting said semi-gel to the action of free alkaline earth metal ions to cause said semi-gel to form a heat-irreversible advanced gel and frying said advanced gel.

2. A process of preparing a firm, rigid food structure containing foodstuffs comprising the steps of forming a thixotropic semi-gel comprising a water solution of a colloid having food particles, a substantially insoluble salt of an edible alkaline earth metal and an edible acid slightly soluble at room temperature and highly soluble at high temperatures homogeneously dispersed therein, heating said semi-gel to cause said acid to dissolve and solubilize said salt and form a heat irreversible advanced gel and heating said advanced gel to form a rigid structure having substantially no gel characteristics.

3. A process of preparing a firm, rigid structure containing foodstuffs comprising the steps of dispersing said foodstuffs in a thixotropic semi-gel comprising a water and oil emulsion of a colloid, subjecting said semi-gel to the action of free alkaline earth metal ions to cause said semi-gel to form a heat-irreversible advanced gel and cooking said advanced gel until the gel characteristics have substantially disappeared.

4. An edible food product prepared by the process defined in claim 1 comprising a dried, self-supporting, crispy, friable cellular framework having cooked food particles enclosed therein.

5. A process for the preparation of a firm, rigid structure containing discreet particles of various foodstuffs dispersed therein comprising the steps of initially dispersing such foodstuffs in the cold in a thixotropic semi-gel of a colloid dissolved in water, the said colloid solution including a finely divided suspension of a salt of an edible alkaline earth metal which is very slightly soluble, an insoluble salt of an edible alkaline earth metal, a soluble, edible acid, an edible acid very slightly soluble at low temperatures and highly soluble at high temperatures, the quantities of said soluble edible acid and said very slightly soluble salt of an alkaline earth metal being sufficient to initiate gel formation in cold water but insufficient to cause gelatinization of the mixture to form a firm gel, and then heating said colloid to solubilize said acid highly soluble at high temperatures, thereby acidifying the solution to liberate soluble alkaline earth ions and convert said semi-gel to a heat-irreversible firm gel and heating said firm gel to form a firm rigid structure having substantially no gel characteristics.

6. A process of preparing food products comprising the steps of; homogeneously distributing food particles in a water colloid solution, subjecting said water colloid solution to the action of free alkaline earth metal ions to cause said solution to form a heat-irreversible advanced gel while maintaining said food particles in their homogeneously dispersed condition, and cooking said food particles causing the gel characteristics to at least partially disappear.

7. A process of preparing food products comprising the steps of; homogeneously distributing a starchy food powder in a water colloid solution, subjecting said water colloid solution to the action of free alkaline earth metal ions to cause said solution to form a heat-irreversible advanced gel while maintaining said food powder in its homogeneously dispersed condition, cutting said advanced gel into thin slices, and cooking said slices causing the substantial disappearance of gel characteristics.

8. A process of preparing food products comprising the steps of; homogeneously distributing food particles in a water colloid solution without substantially hydrating said food particles, subjecting said water colloid solution to the action of free alkaline earth metal ions to cause said solution to form a heat-irreversible advanced gel while maintaining said food particles in their homogeneously dispersed substantially unhydrated condition, and cooking said food particles causing the gel characteristics to at least partially disappear.

9. A process of preparing food products according to claim 6 wherein the food particels comprise fruit particles.

10. A process of preparing food products according to claim 6 wherein the food particles comprise vegetable particles.

11. A process of preparing food products according to claim 6 wherein the food particles comprise meat particles.

12. A process of preparing food products according to claim 11 wherein the meat particles comprise sausage meat particles and the resultant product is a sausage-like product.

13. A process of preparing food products according to claim 11 wherein the meat particles comprise hamburger meat and the resultant product is a hamburger-like product.

14. An edible meat product prepared by the process of claim 11.

15. A process of preparing food products according to claim 6 wherein the food particles comprise seafood particles.

16. A process of preparing food products comprising the steps of; homogeneously distributing a starchy food powder in a water colloid solution, subjecting said water colloid solution to the action of free alkaline earth metal ions to cause said solution to form a heat-irreversible advanced gel while maintaining said food powder in its homogeneously dispersed condition, cutting said advanced gel into long slender French-fry pieces, and frying said pieces causing the disappearance of gel characteristics to a substantial extent.

17. A process of preparing a food product comprising a firm, rigid gel structure capable of resisting freezing and thawing, comprising the steps of forming at substantially freezing temperatures a thixotropic semi-gel from food particles, water, and cold-water gel-forming ingredients and permitting said semi-gel to set to an advanced gel at substantially freezing temperatures and freezing said advanced gel.

18. A process of preparing food products comprising the steps of: mixing food particles, an insoluble salt of an edible alkaline earth metal, an edible hydrophilic colloid, an edible acid, and water to form a semi-gel having said food particles homogeneously dispersed therein, permitting said semi-gel to set into a heat, irreversible advanced gel, and cooking said advanced gel to produce a food product having a firm, rigid structure exhibiting substantially no gel characteristics.

19. The process of claim 18 in which a soluble edible acid is employed and said advanced gel is formed prior to the cooking step.

20. The process of claim 18 in which an edible acid substantially insoluble in water at room temperatures but highly soluble at high temperatures is employed and said advanced gel is formed during the cooking step.

21. A process of preparing food products comprising the steps of: mixing food particles, an insoluble salt of an edible alkaline earth metal, an edible hydrophilic colloid, a soluble edible acid and water to form a semi-gel having said food particles homogeneousy dispersed therein, permitting said semi-gel to set to an advanced gel, cutting said advanced gel into relatively thin slices and frying said slices to produce a crispy chip-like product exhibiting substantially no gel characteristics.

22. A process of preparing potato chips comprising the steps of: mixing potato flour, an insoluble salt of an edible alkaline earth metal, an edible hydrophilic colloid, a soluble edible acid and water to form a semi-gel having particles of potato flour homogeneously dispersed therein, permitting said semi-gel to set to an advanced gel, cutting said advanced gel into relatively thin slices, and frying said slices thereby producing a crispy chip having a firm, rigid structure exhibiting substantially no gel characteristics.

23. The process of claim 22 wherein said slices of advanced gel are placed in a solidification solution of a soluble calcium salt and are rinsed prior to frying.

24. A process of preparing shaped food products comprising the steps of dispersing food particles in a fluid solution which will set to a heat-irreversible advanced gel, permitting the resultant mass to set to said advanced gel, forming said advanced gel into shaped pieces and cooking said shaped pieces to produce food products having substantially no gel characteristics.

25. A process of preparing shaped food products according to claim 24 wherein said food particles are particles of a dehydrated natural food and the quantity of said food particles dispersed in said fluid solution is less than that required to reconstitute said natural food whereby the resultant food is similar to a cooked natural food product but is of a lower calorie content.

26. In a process for preparing chip-like or biscuit-like food products from food particles, the improvement comprising: dispersing said food particles in a heat-irreversible gel-forming fluid and after the resultant mass has set to a gel of a consistency sufficiently strong to enable said mass to be sliced into pieces which may be manipulated in a cooking operation, cutting said mass into said slices and cooking said slices to form said chip-like or biscuit-like product, said gel being destroyed by the cooking operation whereby the resultant product has substantially no gel characteristics.

27. A potato-chip-like product prepared by the process defined in claim 24 comprising a dried, self-supporting, crispy, friable framework having finely divided potato particles enclosed therein.

References Cited in the file of this patent

UNITED STATES PATENTS

| | | |
|---|---|---|
| 1,795,980 | Wahl | Mar. 10, 1931 |
| 2,036,922 | Clark et al. | Apr. 7, 1936 |
| 2,233,574 | Baker et al. | Mar. 4, 1941 |
| 2,334,281 | Olsen et al. | Nov. 16, 1943 |
| 2,373,729 | Williaman | Apr. 17, 1945 |
| 2,403,547 | Peschardt | July 9, 1946 |
| 2,441,729 | Steiner | May 18, 1948 |